(12) United States Patent
Baek

(10) Patent No.: US 11,327,188 B2
(45) Date of Patent: May 10, 2022

(54) ROBUST ARRIVAL PICKING OF SEISMIC VIBRATORY WAVES

(71) Applicant: SAUDI ARABIAN OIL COMPANY, Dhahran (SA)

(72) Inventor: Hyoungsu Baek, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 521 days.

(21) Appl. No.: 16/108,831

(22) Filed: Aug. 22, 2018

(65) Prior Publication Data

US 2020/0064506 A1 Feb. 27, 2020

(51) Int. Cl.
*G01V 1/00* (2006.01)
*G01V 1/28* (2006.01)
*G01V 1/30* (2006.01)

(52) U.S. Cl.
CPC .............. *G01V 1/282* (2013.01); *G01V 1/284* (2013.01); *G01V 1/305* (2013.01); *G01V 1/307* (2013.01)

(58) Field of Classification Search
None
See application file for complete search history.

(56) References Cited

U.S. PATENT DOCUMENTS

| 2,634,317 | A | * | 4/1953 | Marchand | .......... | G01R 33/1215 |
| | | | | | | 324/377 |
| 2,920,308 | A | * | 1/1960 | Williams | ................ | G01V 1/181 |
| | | | | | | 367/184 |
| 3,062,314 | A | * | 11/1962 | Vogel | ....................... | G01V 1/46 |
| | | | | | | 367/34 |
| 3,131,375 | A | * | 4/1964 | Watson | .................... | G01V 1/28 |
| | | | | | | 367/63 |

(Continued)

FOREIGN PATENT DOCUMENTS

| EP | 2229595 B1 | * | 5/2015 | ................ | G01V 1/18 |
| GB | 2372568 A | * | 8/2002 | ................ | G01V 1/16 |

(Continued)

OTHER PUBLICATIONS

De Meersman, K., J-M. Kendall, and M. Van der Baan. "The 1998 Valhall microseismic data set: An integrated study of relocated sources, seismic multiplets, and S-wave splitting." Geophysics 74.5 (2009): B183-B195. (Year: 2009).*

(Continued)

*Primary Examiner* — Isam A Alsomiri
*Assistant Examiner* — Jonathan D Armstrong
(74) *Attorney, Agent, or Firm* — Fish & Richardson P.C.

(57) ABSTRACT

A computer-implemented method can include the following. Seismic vibratory waves through the Earth along a selected vector path are received. An initial value is selected for a first arrival for each of the seismic vibratory waves. Initial values are determined for travel times and velocities of the seismic (Continued)

vibratory waves. Reversed signs of amplitudes of the seismic vibratory waves are determined and corrected. Time intervals are determined based on the initial values of the travel times. Time windowing and filtering in a frequency domain are performed. Final values are determined for first arrivals and travel times for each of the seismic vibratory waves based on the time windowing and filtering. Final values are determined for velocities of the seismic vibratory waves.

17 Claims, 4 Drawing Sheets

(56) References Cited

U.S. PATENT DOCUMENTS

| | | | | |
|---|---|---|---|---|
| 3,321,740 | A * | 5/1967 | Lee | G01V 1/362 367/40 |
| 3,343,626 | A * | 9/1967 | Sparks | G01V 1/04 367/63 |
| 3,496,529 | A * | 2/1970 | Anstey | G01V 1/366 367/40 |
| 3,530,430 | A * | 9/1970 | Embree | G01V 1/28 367/40 |
| 3,564,494 | A * | 2/1971 | Frasier et al. | G01V 1/364 367/43 |
| 3,599,175 | A * | 8/1971 | Hollingsworth | G01V 1/366 367/42 |
| 3,742,443 | A * | 6/1973 | Foster | E21B 47/18 367/83 |
| 3,858,169 | A * | 12/1974 | Bardeen | G01V 1/20 367/140 |
| 4,286,687 | A * | 9/1981 | Fiske, Jr. | G01V 1/133 181/120 |
| 4,646,239 | A * | 2/1987 | Bodine | G01V 1/34 367/38 |
| 5,095,464 | A * | 3/1992 | Bednar | G01V 13/00 367/13 |
| 5,121,362 | A * | 6/1992 | Bednar | G01V 13/00 367/13 |
| 5,696,734 | A * | 12/1997 | Corrigan | G01V 1/364 367/22 |
| 5,991,237 | A * | 11/1999 | de Bazelaire | G01V 1/303 367/50 |
| 7,525,873 | B1 * | 4/2009 | Bush | G01V 1/28 367/37 |
| 8,040,754 | B1 * | 10/2011 | Hardage | G01V 1/284 367/38 |
| 2001/0046185 | A1 * | 11/2001 | Hornbostel | G01V 3/082 367/38 |
| 2003/0031091 | A1 * | 2/2003 | Kim | G01V 1/28 367/37 |
| 2003/0168213 | A1 * | 9/2003 | Harmon | G01V 11/002 166/250.01 |
| 2004/0076077 | A1 * | 4/2004 | Robertsson | G01V 1/286 367/15 |
| 2006/0247860 | A1 * | 11/2006 | Angerer | G01V 1/364 702/14 |
| 2008/0229832 | A1 | 9/2008 | Huang et al. | |
| 2009/0251993 | A1 * | 10/2009 | Berris, Jr. | G01V 1/40 367/29 |
| 2010/0118646 | A1 * | 5/2010 | Tenghamn | G01V 1/005 367/21 |
| 2010/0118647 | A1 * | 5/2010 | Tenghamn | G01V 1/005 367/24 |
| 2011/0044131 | A1 * | 2/2011 | Thornton | G01V 1/42 367/38 |
| 2012/0041682 | A1 * | 2/2012 | Ramirez-Perez | G01V 1/364 702/17 |
| 2012/0051177 | A1 * | 3/2012 | Hardage | G01V 1/286 367/43 |
| 2012/0163121 | A1 * | 6/2012 | Hardage | G01V 1/38 367/21 |
| 2013/0158878 | A1 * | 6/2013 | Rebel | G01V 1/366 702/14 |
| 2013/0215717 | A1 * | 8/2013 | Hofland | G01V 1/288 367/59 |
| 2013/0265851 | A1 * | 10/2013 | Faber | G01V 1/288 367/25 |
| 2013/0279290 | A1 * | 10/2013 | Poole | G01V 1/38 367/24 |
| 2014/0169129 | A1 * | 6/2014 | Orban | G01V 1/40 367/25 |
| 2014/0226437 | A1 * | 8/2014 | Chambers | G01V 1/36 367/7 |
| 2014/0307928 | A1 * | 10/2014 | Jing | G01V 1/303 382/109 |
| 2014/0362658 | A1 * | 12/2014 | Poole | G01V 1/36 367/7 |
| 2015/0006085 | A1 * | 1/2015 | Bisley | G01V 1/36 702/14 |
| 2015/0112601 | A1 * | 4/2015 | Ozbek | G01V 1/366 702/14 |
| 2015/0177400 | A1 * | 6/2015 | Ozbek | G01V 1/288 367/7 |
| 2015/0260866 | A1 * | 9/2015 | Kim | G01V 1/3808 367/15 |
| 2015/0377661 | A1 * | 12/2015 | Edwards | E21B 47/113 702/94 |
| 2016/0187513 | A1 * | 6/2016 | Poole | G01V 1/38 702/16 |
| 2016/0377751 | A1 | 12/2016 | De Meersman et al. | |
| 2017/0031045 | A1 * | 2/2017 | Poole | G01V 1/364 |
| 2017/0074688 | A1 * | 3/2017 | Crickmore | G01K 11/3206 |
| 2017/0097430 | A1 * | 4/2017 | Eisner | G01V 1/288 |
| 2017/0102470 | A1 * | 4/2017 | Jeremic | G01V 1/42 |
| 2017/0248721 | A1 * | 8/2017 | Poole | G01V 1/36 |
| 2018/0164452 | A1 * | 6/2018 | Oukili | G01V 1/38 |
| 2019/0086566 | A1 * | 3/2019 | Pugh | G01V 1/288 |
| 2020/0132872 | A1 * | 4/2020 | Dossary | G01V 1/364 |
| 2020/0233112 | A1 * | 7/2020 | Zhao | G01V 1/282 |

FOREIGN PATENT DOCUMENTS

| | | | | |
|---|---|---|---|---|
| WO | WO-2011022198 | A1 * | 2/2011 | G01V 1/288 |
| WO | WO-2013190512 | A2 * | 12/2013 | G01V 1/366 |
| WO | WO-2015078842 | A1 * | 6/2015 | G01V 1/284 |

OTHER PUBLICATIONS

Brown, R. James, Robert R. Stewart, and Don C. Lawton. "A proposed polarity standard for multicomponent seismic data." Geophysics 67.4 (2002): 1028-1037. (Year: 2002).*
Rosales, Daniel, and James Rickett. "PS-wave polarity reversal in angle domain common-image gathers." SEG Technical Program Expanded Abstracts 2001. Society of Exploration Geophysicists, 2001. 1843-1846. (Year: 2001).*
Brown, R. James, et al. "An acquisition polarity standard for multicomponent seismic data." CREWES Research Report (2000). (Year: 2000).*
Mahmoudian, Faranak, and Gary F. Margrave. "Short note: A proposed polarity check for multi-component seismic data." CREWES Research Report—vol. 18 (2006). (Year: 2006).*
Molyneux and Schmitt, "First-breaking timing: arrival onset times by direct correlation," Geophysics, 64(5), Sep. 1999, 10 pages.
Murat and Rudman, "Automated First Arrival Picking: A Neural Network Approach1," Geophysical Prospecting, vol. 40, Issue 6, Aug. 1992, 18 pages.
Qu et al., "Novel automatic first-arrival picking method for ultrasound sound-speed tomography," Japanese Journal of Applied Physics, vol. 54, No. 7S1, Jun. 2015, 10 pages.
Akram and Eaton, "Refinement of arrival-time picks using an iterative, cross-correlation based workflow," GeoConvention 2014: Focus, 2014, 6 pages.
International Search Report and Written Opinion in PCTAppln. No. PCT/US2019/047396, dated Dec. 4, 2019, 18 pages.

(56) References Cited

OTHER PUBLICATIONS

GCC Examination Report in Gulf Cooperation Council Appln. No. GC 2019-38141, dated Sep. 10, 2020, 4 pages.

\* cited by examiner

ROBUST ARRIVAL PICKING OF SEISMIC VIBRATORY WAVES

BACKGROUND

The present disclosure applies to measuring vibratory waves that are used for determining the geology of the Earth in a particular location. For example, various techniques are currently used to measure elastic wave propagation speeds in order to characterize rock samples. The wave propagation speed can depend, for example, on the density, bulk modulus, and shear modulus of the rock sample. Attenuation and anisotropy can be inferred from amplitude changes and wave propagation speeds at different directions. In order to measure wave propagation speed in a rock sample, experimental setups can include primary (P) and secondary (S) sources on one side of the rock sample, and accelerometers can be positioned on the other side of the sample. In order to offset the effect of end caps on the arrival times and waveforms, sample blocks with known properties can be used to generate head-to-head (or baseline) data.

After data associated with the vibratory waves has been recorded, first arrivals associated with the vibratory waves can be picked manually. However, manual picking can be very time consuming and typically is not repeatable, meaning that different outcomes can result using the same information. Moreover, manual picking may not be consistent among the samples, which may lead to errors and biases that can result in the erroneous estimation of physical sample properties and wave speeds.

A full elastic seismic wave field that propagates through an isotropic Earth consists of a primary (P)-wave component and two shear wave components: shear horizontal (SH) and shear vertical (SV). In a flat-layered isotropic Earth, an SH displacement vector of the SH-wave component is parallel to strata bedding, and an SV displacement vector of the SV-wave component is in a plane that is perpendicular to the strata bedding. The three components of waves (P, SH, SV) can be measured at the same time. In some implementations, the polarity of shear waves (SH and SV) can be reversed, depending on the orientation of receivers or a connection between a receiver and an acquisition device. Some shear wave arrivals may be contaminated with P-wave arrivals and reflections inside the endcaps, which makes shear wave arrival picking even more challenging. Reversed polarity of shear waves can cause erroneous picking. Thus, it is beneficial to detect and correct polarity reversal.

SUMMARY

The present disclosure describes techniques that can be used for determining velocities of seismic vibratory waves. In some implementations, a computer-implemented method includes the following. A computer-implemented method can include the following. Seismic vibratory waves through the Earth along a selected vector path are received. An initial value is selected for a first arrival for each of the seismic vibratory waves. Initial values are determined for travel times and velocities of the seismic vibratory waves. Reversed signs of amplitudes of the seismic vibratory waves are determined and corrected. Time intervals are determined based on the initial values of the travel times. Time windowing and filtering in a frequency domain are performed. First arrivals and travel times from one end to the other for each of the seismic vibratory waves are determined based on the time windowed and filtered data. Final values are determined for velocities of the seismic vibratory waves.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, polarity changes in shear waves can be detected using a dot product test and the input trace can be reversed. Second, accuracy can be improved when picking slow arrivals of P-waves that may be contaminated with P-waves bouncing around the receiver. Third, head-to-head measurements can be used as a reference in determining how wave information is to be processed. Fourth, initial estimates for velocities of P-wave, SV-waves, and SH-waves can be made before picking the peaks. Fifth, windowing can be used for recording traces in time and for filtering by frequency to improve noise reduction and to make peak picking more reliable. Sixth, the arrivals of multicomponent waves can be picked automatically and accurately.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for measuring vibratory waves that are used for determining the geology of the Earth in a particular location. For example, multi-component data, including a primary (P)-wave component and two shear wave components shear horizontal (SH) and shear vertical (SV), can be processed simultaneously and analyzed in combination, instead of separately. In order to pick first arrivals of three components, the polarity of the wave should agree with that of corresponding head to head data. Reversed polarity in shear waves can be detected and automatically corrected.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, automated techniques can be used with the simultaneous picking of first arrivals in three-component recording. The automation techniques can also detect and correct reversed polarities of shear waves SV and SH. The detection and correction can lead to faster data analysis and can enhance the repeatability of the tests and the accuracy of the data analysis. The automated techniques can handle three components at the same time, for example, producing three travel times of P-waves, SV-waves, and SH-waves. The travel times can be converted to wave propagation speeds. The automated techniques can also be used to correct distorted waveforms due to the overlapping with reflected waves when the end cap geometry is known.

In some implementations, a software tool can be developed for the analysis of data that are collected in elastic wave propagation experiment through a rock sample. On one end of the sample, there is an assembly with three directional vibrational sources, generating P-, SV-, and SH-waves. In the opposite side of the sample, there is an assembly with three directional receivers, which records motions in three directions. The software tool that can be developed performs tasks as described in the following flow diagram.

Figure 1:
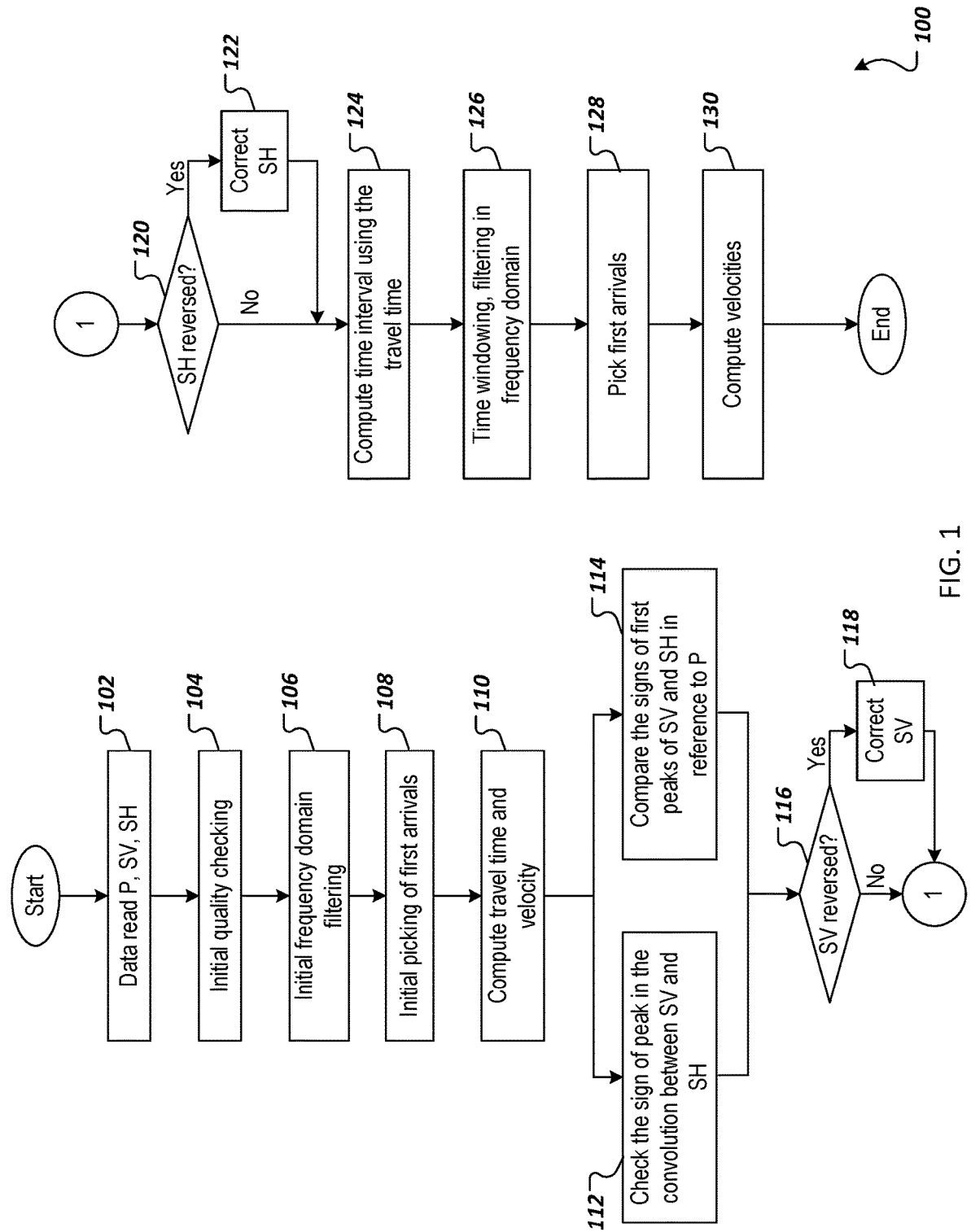
FIG. 1 is a flow diagram of an example of a detailed method for computing velocities of waves through the Earth, according to some implementations of the present disclosure.

FIG. 1 is a flow diagram of an example of a detailed method 100 for computing velocities of waves through the Earth, according to some implementations of the present disclosure. At 102, P-waves, SV-waves, and SH-waves are received. The waves can be received, for example, by one or more receivers after being transmitted by one or more vibratory sources. At 104 initial quality checking occurs. For example, there should be no recorded signal before excitation; the frequency contents of the recorded signal should be similar to those of the excitation source. At 106, initial frequency domain filtering occurs. Since the dominant frequency of the excitation source is known, the recorded data can be processed to remove frequency components that are not in proximity to the dominant source frequency. At 108, initial values of first arrivals are picked using the received P-waves, SV-waves, and SH-waves. For example, initial values can be chosen based on received wave information, which may not be accurate due to reversed signs on some of the waves. At 110, travel times and velocities are computed based on the first arrivals and information from the vibratory sources that identifies times at which the vibrations started.

At 112, a check is made in the mathematical sign of the peak between the convolution between the SV-wave and the SH-wave. At 114, a comparison is made between the mathematical signs of the SV-wave and the SH-wave in reference to the P-wave. At 116, if the mathematical sign of the SV-wave is reversed, then the SV-wave is corrected at 118. At 120, if the mathematical sign of the SH-wave is reversed, then the SH-wave is corrected at 122.

At 124, the time interval is computed using the travel time. At 126, time windowing and filtering in the frequency domain occur. At 128, first arrivals are picked, providing more accurate first arrival values than were initially picked at 108. At 130, velocities are computed. For example, the velocities can be computed based on the first arrival times and the times that the waves were transmitted by the vibratory sources.

Figure 2:
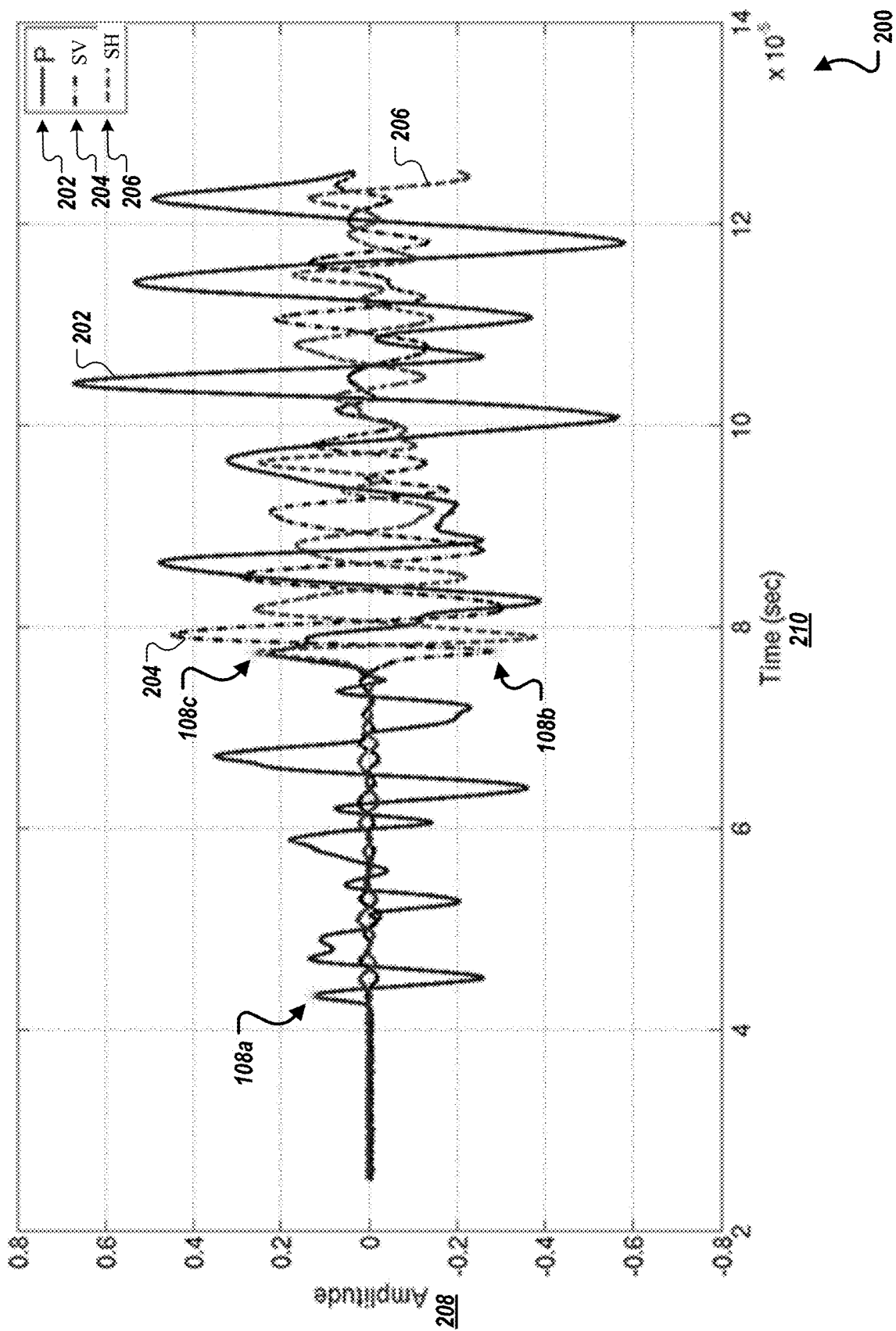
FIG. 2 is a graph showing example plots indicating a raw recording of waves over time, according to some implementations of the present disclosure.

FIG. 2 is a graph showing example plots 202, 204, and 206 indicating a raw recording of waves over time, according to some implementations of the present disclosure. For example, the waves include P-wave 202, SH-wave 204, and SV-wave 206. The SH-wave 204, for example, has a reversed polarity, which needs to detected so that a proper comparison can be made with a corresponding head-to-head measurement. After the correction, final picks for first arrivals, such as using the method 100, are shown to be in good agreement with expected results.

Figure 3:
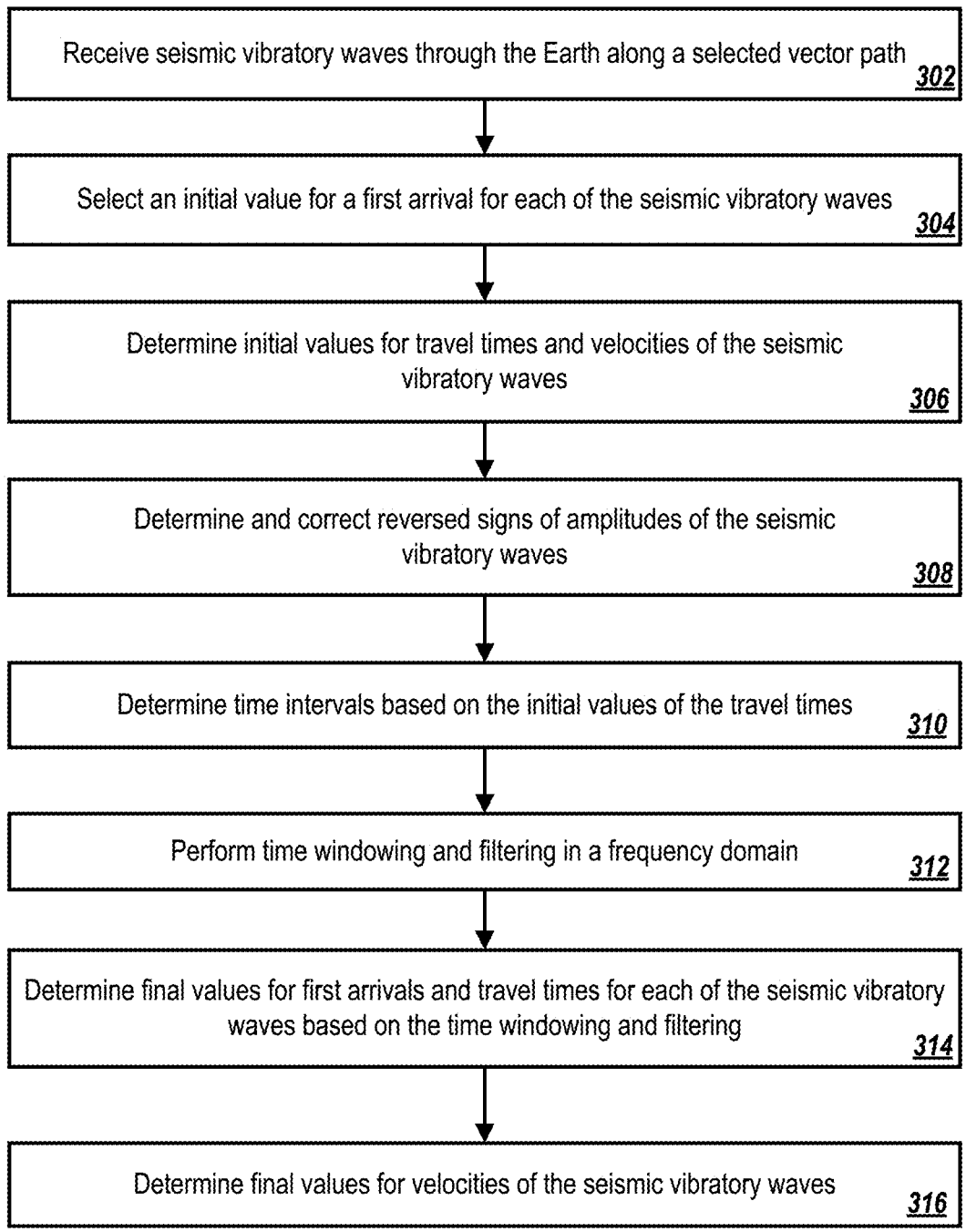
FIG. 3 is a flowchart of an example method for determining velocities of seismic vibratory waves, according to some implementations of the present disclosure.

FIG. 3 is a flowchart of an example method 300 for determining velocities of seismic vibratory waves, according to some implementations of the present disclosure. For clarity of presentation, the description that follows generally describes method 300 in the context of the other figures in this description. However, it will be understood that method 300 may be performed, for example, by any system, environment, software, and hardware, or a combination of systems, environments, software, and hardware. In some implementations, various steps of method 300 can be run in parallel, in combination, in loops, or in any order.

At 302, seismic vibratory waves are received through the Earth along a selected vector path. The waves can be received, for example, by one or more receivers after being transmitted by one or more vibratory sources. From 302, method 300 proceeds to 304.

At 304, an initial value is selected for a first arrival for each of the seismic vibratory waves. As an example, initial values of first arrivals can be chosen based on received wave information, which may not be accurate due to reversed signs on some of the waves. In some implementations, selecting an initial first arrival includes initial quality checking and initial frequency domain filtering. For example, if there are recorded signals before excitation, it indicates that the experimental setup is wrong. The frequency contents of the recorded signal should be similar to those of the excitation source. Otherwise, something went wrong during the experiment and hence, the analysis cannot proceed. For initial frequency domain filtering, the known (preset) dominant frequency of the excitation source is used. The recorded data are processed to remove frequency components that are not in proximity to the dominant source frequency. From 304, method 300 proceeds to 306.

At 306, initial values are determined for travel times and velocities of the seismic vibratory waves. For example, travel times can be calculated based on initial values of first arrivals, which may not be accurate due to reversed signs on some of the waves. From 306, method 300 proceeds to 308.

At 308, reversed signs of amplitudes of the seismic vibratory waves are determined and corrected. For example, a sign of a peak in a convolution between the SV-wave and the SH-wave can be checked, and a comparison can be made in the signs of first peaks of the SV-wave and the SH-wave in reference to the P-wave. The sign of the SV-wave can be corrected if the sign of the SV-wave is reversed. Additionally, the sign of the SH-wave can be corrected if the sign of SH-wave is reversed. From 308, method 300 proceeds to 310.

At 310, time intervals are determined based on the initial values of the travel times. For example, the time intervals determined in this step can be based, at least in part, on corrected signs from step 308. From 310, method 300 proceeds to 312.

At 312, time windowing and filtering in a frequency domain are performed. From 312, method 300 proceeds to 314.

At 314, final values for first arrivals and travel times are determined for each of the seismic vibratory waves based on the time windowing and filtering. Using the initial estimate of velocities and dimensions of the rock samples, the arrival times of P and S waves can be estimated. Time intervals including two wavelets around the expected arrival times can be chosen as the analysis interval for final picking. Such time windows increase the chances of removing reflections and focusing on the first arrival events. The windowed signal can be filtered in the frequency domain in order to get cleaner signals. From 314, method 300 proceeds to 316.

At 316, final values for velocities of the seismic vibratory waves are determined. For example, the velocities can be computed based on the final values of the first arrival times and the times that the waves were transmitted by the vibratory sources. After 316, method 300 stops.

The velocities obtained through first arrival picking is so critical and fundamental in that these information are used to determine (or build) initial velocity models both in the well and between the wells. Such volumetric velocity models can be updated with more seismic surveys in order to provide accurate velocity information for seismic imaging. The location of seismic events in an image relies on the velocity model. Clean and high resolution seismic images are critical because they are used for mission critical decision making such as prospecting and drilling path planning.

Figure 4:
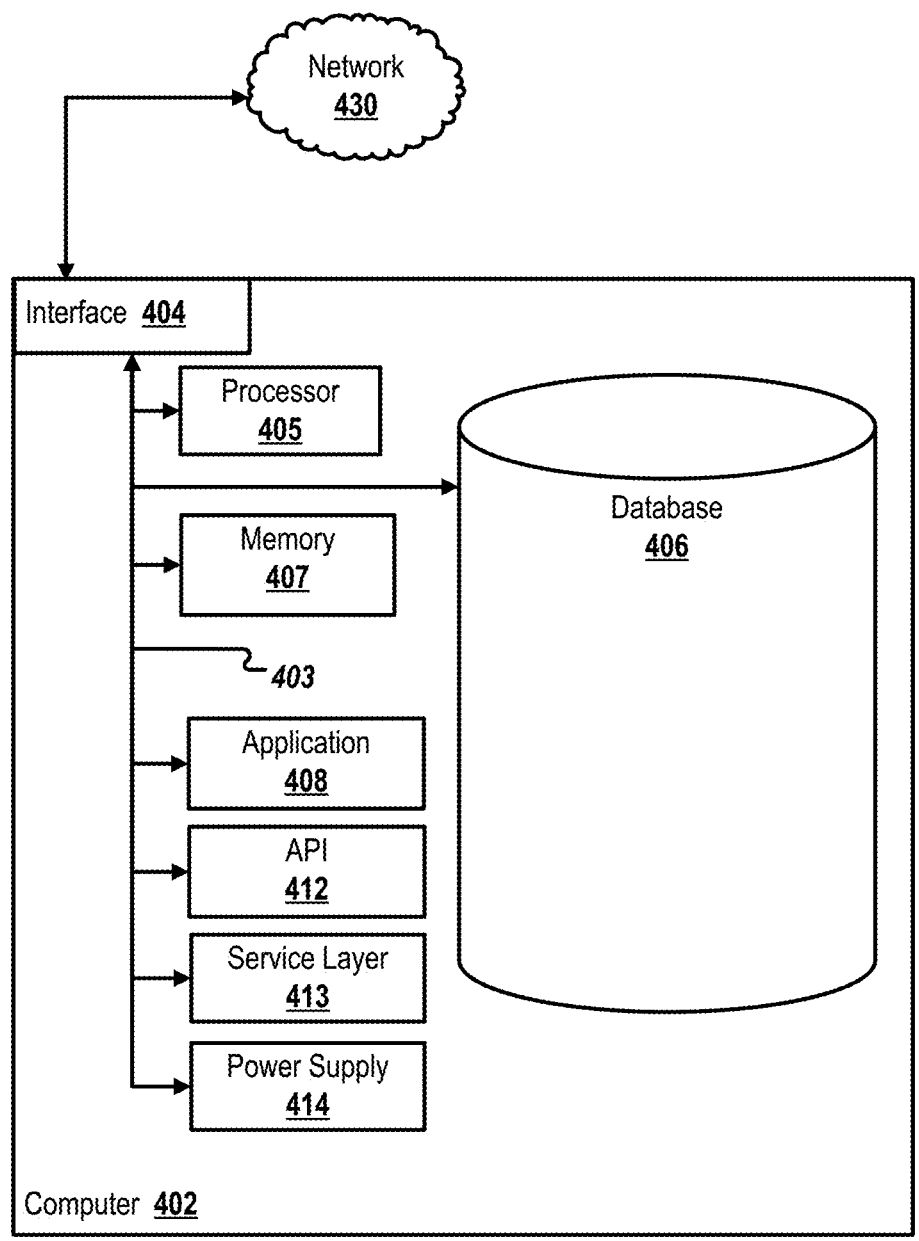
FIG. 4 is a block diagram illustrating an example computer system used to provide computational functionalities associated with described algorithms, methods, functions, processes, flows, and procedures as described in the instant disclosure, according to some implementations of the present disclosure.

FIG. 4 is a block diagram of an example computer system 400 used to provide computational functionalities associated with described algorithms, methods, functions, processes, flows, and procedures, as described in the instant disclosure, according to some implementations of the present disclosure. The illustrated computer 402 is intended to encompass any computing device such as a server, desktop computer, laptop/notebook computer, wireless data port, smart phone, personal data assistant (PDA), tablet computing device, one or more processors within these devices or any other processing device, including physical or virtual instances (or both) of the computing device. Additionally, the computer 402 may comprise a computer that includes an input device, such as a keypad, keyboard, or a touch screen that can accept user information, and an output device that conveys information associated with the operation of the computer 402, including digital data, visual, or audio information (or a combination of information), or a graphical-type user interface (UI) (or GUI).

The computer 402 can serve in a role as a client, network component, a server, a database, a persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, or global environment (or a combination of environments).

The computer 402 is an electronic computing device operable to receive, transmit, process, store, or manage data and information associated with the described subject matter. According to some implementations, the computer 402 may also include or be communicably coupled with an application server, email server, web server, caching server, streaming data server, or a combination of servers.

The computer 402 can receive requests over network 430 from a client application (for example, executing on another computer 402) and respond to the received requests by processing the received requests using software applications. In addition, requests may also be sent to the computer 402 from internal users (for example, from a command console or by another access method), external or third-parties, other automated applications, as well as other entities, individuals, systems, or computers.

Each of the components of the computer 402 can communicate using a system bus 403. In some implementations, any or all of the components of the computer 402, hardware or software (or a combination of both hardware and software), may interface with each other or the interface 404 (or a combination of both), over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 and other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA or C++, providing data in extensible markup language (XML) format. While illustrated as an integrated component of the computer 402, alternative implementations may illustrate the API 412 or the service layer 413 as stand-alone components in relation to other components of the computer 402 and other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems that are connected to the network 430 (whether illustrated or not) in a distributed environment. Generally, the interface 404 comprises logic encoded in software or hardware (or a combination of software and hardware) and is operable to communicate with the network 430. More specifically, the interface 404 may comprise software supporting one or more communication protocols associated with communications such that the network 430 or interface's hardware is operable to communicate physical waves within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 and other components (or a combination of both) that can be connected to the network 430 (whether illustrated or not). For example, database 406 can be an in-memory or conventional storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402.

The computer 402 also includes a memory 407 that can hold data for the computer 402 and other components (or a combination of both) that can be connected to the network 430 (whether illustrated or not). Memory 407 can store any data consistent with this disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, or applications. Further, although illustrated as a single application 408, the application 408 may be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another other power management functionality). In some implementations, the power-supply 414 can include a power plug to allow the computer 402 to be plugged into a wall socket or other power source to, for example, power the computer 402 or recharge a rechargeable battery.

There may be any number of computers 402 associated with, or external to, a computer system containing computer 402, each computer 402 communicating over network 430. Further, the term "client," "user," and other terminology may be used interchangeably without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method, comprising: receiving seismic vibratory waves through the Earth along a selected vector path; selecting an initial value for a first arrival for each of the seismic vibratory waves; determining initial values for travel times and velocities of the seismic vibratory waves; determining and correcting reversed signs of amplitudes of the seismic vibratory waves; determining time intervals based on the initial values of the travel times; performing time windowing and filtering in a frequency domain; determining final values for first arrivals and travel times for each of the seismic vibratory waves based on the time windowing and filtering; and determining final values for velocities of the seismic vibratory waves.

The foregoing and other described implementations can each, optionally, include one or more of the following features:

A first feature, combinable with any of the following features, wherein the seismic vibratory waves comprise P-waves, SV-waves, and SH-waves.

A second feature, combinable with any of the previous or following features, wherein selecting an initial first arrival includes initial quality checking and initial frequency domain filtering.

A third feature, combinable with any of the previous or following features, wherein determining and correcting reversed signs of amplitudes of the seismic vibratory waves includes: checking a sign of a peak in a convolution between the SV-wave and the SH-wave; comparing signs of first peaks of the SV-wave and the SH-wave in reference to the P-wave; and correcting the sign of the SV-wave if the sign of the SV-wave is reversed.

A fourth feature, combinable with any of the previous or following features, the method further comprising correcting the sign of the SH-wave if the sign of SH-wave is reversed.

A fifth feature, combinable with any of the previous or following features, the method further comprising determining, using velocities obtained through first arrival picking, initial velocity models both in a well and between wells.

A sixth feature, combinable with any of the previous or following features, wherein the seismic vibratory waves are received after being transmitted by one or more vibratory sources.

In a second implementation, a non-transitory, computer-readable medium storing one or more instructions executable by a computer system to perform operations comprising: receiving seismic vibratory waves through the Earth along a selected vector path; selecting an initial value for a first arrival for each of the seismic vibratory waves; determining initial values for travel times and velocities of the seismic vibratory waves; determining and correcting reversed signs of amplitudes of the seismic vibratory waves; determining time intervals based on the initial values of the travel times; performing time windowing and filtering in a frequency domain; determining final values for first arrivals and travel times for each of the seismic vibratory waves based on the time windowing and filtering; and determining final values for velocities of the seismic vibratory waves.

The foregoing and other described implementations can each, optionally, include one or more of the following features:

A first feature, combinable with any of the following features, wherein the seismic vibratory waves comprise P-waves, SV-waves, and SH-waves.

A second feature, combinable with any of the previous or following features, wherein selecting an initial first arrival includes initial quality checking and initial frequency domain filtering.

A third feature, combinable with any of the previous or following features, wherein determining and correcting reversed signs of amplitudes of the seismic vibratory waves includes: checking a sign of a peak in a convolution between the SV-wave and the SH-wave; comparing signs of first peaks of the SV-wave and the SH-wave in reference to the P-wave; and correcting the sign of the SV-wave if the sign of the SV-wave is reversed.

A fourth feature, combinable with any of the previous or following features, the operations further comprising correcting the sign of the SH-wave if the sign of SH-wave is reversed.

A fifth feature, combinable with any of the previous or following features, the operations further comprising determining, using velocities obtained through first arrival picking, initial velocity models both in a well and between wells.

A sixth feature, combinable with any of the previous or following features, wherein the seismic vibratory waves are received after being transmitted by one or more vibratory sources.

In a third implementation, a computer-implemented system, comprising: one or more processors; and a non-transitory computer-readable storage medium coupled to the one or more processors and storing programming instructions for execution by the one or more processors, the programming instructions instruct the one or more processors to perform operations comprising: receiving seismic vibratory waves through the Earth along a selected vector path; selecting an initial value for a first arrival for each of the seismic vibratory waves; determining initial values for travel times and velocities of the seismic vibratory waves; determining and correcting reversed signs of amplitudes of the seismic vibratory waves; determining time intervals based on the initial values of the travel times; performing time windowing and filtering in a frequency domain; determining final values for first arrivals and travel times for each of the seismic vibratory waves based on the time windowing and filtering; and determining final values for velocities of the seismic vibratory waves.

The foregoing and other described implementations can each, optionally, include one or more of the following features:

A first feature, combinable with any of the following features, wherein the seismic vibratory waves comprise P-waves, SV-waves, and SH-waves.

A second feature, combinable with any of the previous or following features, wherein selecting an initial first arrival includes initial quality checking and initial frequency domain filtering.

A third feature, combinable with any of the previous or following features, wherein determining and correcting reversed signs of amplitudes of the seismic vibratory waves includes: checking a sign of a peak in a convolution between the SV-wave and the SH-wave; comparing signs of first peaks of the SV-wave and the SH-wave in reference to the P-wave; and correcting the sign of the SV-wave if the sign of the SV-wave is reversed.

A fourth feature, combinable with any of the previous or following features, the operations further comprising correcting the sign of the SH-wave if the sign of SH-wave is reversed.

A fifth feature, combinable with any of the previous or following features, the operations further comprising determining, using velocities obtained through first arrival picking, initial velocity models both in a well and between wells.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS, or any other conventional operating system.

A computer program, which may also be referred to or described as a program, software, a software application, a module, a software module, a script, or code can be written in any form of programming language. A computer program can include compiled or interpreted languages, or declarative or procedural languages. A computer program can be deployed in any form, including as a stand-alone program or as a module, component, or subroutine for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or processes, the programs may instead include a number of sub-modules, third-party services, components, or libraries. Conversely, the features and functionality of various components can be combined into single components. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers that can be used for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory) for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other information including any parameters, variables, algorithms, instructions, rules, constraints, or references. Additionally, the memory may include any other data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, or data (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

Cluster file system involved in the present disclosure can be any file system type accessible from multiple servers for read and update. Locking or consistency tracking is not necessary since the locking of exchange file system can be done at application layer. Furthermore, Unicode data files are different from non-Unicode data files.

While this specification contains many specific implementation details, these should not be construed as limitations on the scope of the present disclosure or on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by one or more seismic receivers, a plurality of seismic vibratory waves through a portion of Earth along a selected vector path, wherein the plurality of seismic vibratory waves include a P-wave, an SV-wave, and an SH-wave;
   determining a respective initial value for a travel time and a velocity for each of the plurality of seismic vibratory waves based on a respective initial value for a first arrival of the plurality of seismic vibratory waves;
   reversing, based on a result of comparing a first seismic vibratory wave to a second seismic vibratory wave, a sign of an amplitude of the first seismic vibratory wave, wherein the first seismic vibratory wave is one of the P-wave, SV-wave, and SH-wave, and the second seismic vibratory wave is another of the P-wave, SV-wave, and SH-wave;
   computing a plurality of time intervals for one or more of the seismic vibratory waves based at least on a respective initial value for a travel time of the plurality of vibratory waves;
   based on the plurality of time intervals, identifying windowed signals for the one or more seismic vibratory waves in response to performing time windowing using the respective initial value for the travel time of the plurality of vibratory waves;
   performing, based on the windowed signals, filtering in a frequency domain for respective ones of the plurality of vibratory waves to generate filtered windowed signals;
   determining, based on the filtered windowed signals, final values for first arrivals and travel times for respective ones of the plurality of seismic vibratory waves;
   determining final values for velocities of respective ones of the plurality of seismic vibratory waves.

2. The computer-implemented method of claim 1, comprising selecting an initial value for a first arrival of the plurality of seismic vibratory waves, wherein the selecting includes initial quality checking and initial frequency domain filtering.

3. The computer-implemented method of claim 1, wherein reversing the sign of the first seismic vibratory wave further includes:
   checking a sign of a peak in a convolution between the SV-wave and the SH-wave;
   comparing signs of first peaks of the SV-wave and the SH-wave in reference to the P-wave; and
   correcting the sign of the SV-wave if the sign of the SV-wave is reversed.

4. The computer-implemented method of claim 3, further comprising correcting the sign of the SH-wave if the sign of SH-wave is reversed.

5. The computer-implemented method of claim 1, further comprising determining, using velocities obtained through first arrival picking, initial velocity models both in a well and between wells in the portion of the Earth.

6. The computer-implemented method of claim 1, wherein the seismic vibratory waves are received after being transmitted by one or more vibratory sources.

7. A non-transitory, computer-readable medium storing one or more instructions executable by a computer system to perform operations comprising:
   receiving, by one or more seismic receivers, a plurality of seismic vibratory waves through a portion of Earth along a selected vector path, wherein the plurality of seismic vibratory waves include a P-wave, an SV-wave, and an SH-wave;
   determining a respective initial value for a travel time and a velocity for each of the plurality of seismic vibratory waves based on a respective initial value for a first arrival of the plurality of seismic vibratory waves;
   reversing, based on a result of comparing a first seismic vibratory wave to a second seismic vibratory wave, a sign of an amplitude of the first seismic vibratory wave, wherein the first seismic vibratory wave is one of the P-wave, SV-wave, and SH-wave, and the second seismic vibratory wave is another of the P-wave, SV-wave, and SH-wave;
   computing a plurality of time intervals for one or more of the seismic vibratory waves based at least on a respective initial value for a travel time of the plurality of vibratory waves;

based on the plurality of time intervals, identifying windowed signals for the one or more seismic vibratory waves in response to performing time windowing using the respective initial value for the travel time of the plurality of vibratory waves;

performing, based on the windowed signals, filtering in a frequency domain for respective ones of the plurality of vibratory waves to generate filtered windowed signals;

determining, based on the filtered windowed signals, final values for first arrivals and travel times for respective ones of the plurality of seismic vibratory waves;

determining final values for velocities of respective ones of the plurality of seismic vibratory waves.

8. The non-transitory, computer-readable medium of claim 7, comprising selecting an initial value for a first arrival of the plurality of seismic vibratory waves, wherein the selecting includes initial quality checking and initial frequency domain filtering.

9. The non-transitory, computer-readable medium of claim 7, wherein reversing the sign of the first seismic vibratory wave further includes:
checking a sign of a peak in a convolution between the SV-wave and the SH-wave;
comparing signs of first peaks of the SV-wave and the SH-wave in reference to the P-wave; and
correcting the sign of the SV-wave if the sign of the SV-wave is reversed.

10. The non-transitory, computer-readable medium of claim 9, the operations further comprising correcting the sign of the SH-wave if the sign of SH-wave is reversed.

11. The non-transitory, computer-readable medium of claim 7, the operations further comprising determining, using velocities obtained through first arrival picking, initial velocity models both in a well and between wells in the portion of the Earth.

12. The non-transitory, computer-readable medium of claim 7, wherein the seismic vibratory waves are received after being transmitted by one or more vibratory sources.

13. A computer-implemented system, comprising:
one or more seismic receivers;
one or more processors; and
a non-transitory computer-readable storage medium coupled to the one or more processors and storing programming instructions for execution by the one or more processors, the programming instructions instruct the one or more processors to perform operations comprising:
  receiving, by the one or more seismic receivers, a plurality of seismic vibratory waves through a portion of Earth along a selected vector path, wherein the plurality of seismic vibratory waves include a P-wave, an SV-wave, and an SH-wave;
  determining a respective initial value for a travel time and a velocity for each of the plurality of seismic vibratory waves based on a respective initial value for a first arrival of the plurality of seismic vibratory waves;
  reversing, based on a result of comparing a first seismic vibratory wave to a second seismic vibratory wave, a sign of an amplitude of the first seismic vibratory wave, wherein the first seismic vibratory wave is one of the P-wave, SV-wave, and SH-wave, and the second seismic vibratory wave is another of the P-wave, SV-wave, and SH-wave;
  computing a plurality of time intervals for one or more of the seismic vibratory waves based at least on a respective initial value for a travel time of the plurality of vibratory waves;
  based on the plurality of time intervals, identifying windowed signals for the one or more seismic vibratory waves in response to performing time windowing using the respective initial value for the travel time of the plurality of vibratory waves;
  performing, based on the windowed signals, filtering in a frequency domain for respective ones of the plurality of vibratory waves to generate filtered windowed signals;
  determining, based on the filtered windowed signals, final values for first arrivals and travel times for respective ones of the plurality of seismic vibratory waves;
  determining final values for velocities of respective ones of the plurality of seismic vibratory waves; and
  planning, based on the final values for the velocities, a drilling path for a well in the portion of the Earth.

14. The computer-implemented system of claim 13, comprising selecting an initial value for a first arrival of the plurality of seismic vibratory waves, wherein the selecting includes initial quality checking and initial frequency domain filtering.

15. The computer-implemented system of claim 13, wherein reversing the sign of the first seismic vibratory wave further includes:
checking a sign of a peak in a convolution between the SV-wave and the SH-wave;
comparing signs of first peaks of the SV-wave and the SH-wave in reference to the P-wave; and
correcting the sign of the SV-wave if the sign of the SV-wave is reversed.

16. The computer-implemented system of claim 15, the operations further comprising correcting the sign of the SH-wave if the sign of SH-wave is reversed.

17. The computer-implemented system of claim 13, the operations further comprising determining, using velocities obtained through first arrival picking, initial velocity models both in a well and between wells in the portion of the Earth.

* * * * *